United States Patent [19]

Kimura et al.

[11] Patent Number: 5,282,334
[45] Date of Patent: Feb. 1, 1994

[54] INSECT EXTERMINATOR

[76] Inventors: Kohichiro Kimura; Michael Overturf, both of 642 N. Lamer St., Burbank, Calif. 91506

[21] Appl. No.: 338,866

[22] Filed: Apr. 17, 1989

[51] Int. Cl.$^5$ .............................................. A01M 13/00
[52] U.S. Cl. ........................................ 43/125; 43/129
[58] Field of Search ........................... 43/125, 127, 129

[56] References Cited

U.S. PATENT DOCUMENTS

| 2,662,332 | 12/1953 | McIntire | 43/129 |
|---|---|---|---|
| 2,742,342 | 4/1956 | Dew | 43/129 |
| 2,758,412 | 8/1956 | Loibl | 43/125 |
| 2,784,466 | 3/1957 | Burns | 43/125 |
| 3,279,118 | 10/1966 | Allen | 43/129 |
| 4,214,146 | 7/1980 | Schimanski | 43/129 |
| 4,283,878 | 8/1981 | Hill | 43/129 |
| 4,675,504 | 6/1987 | Suhajda | 43/129 |
| 4,745,705 | 5/1988 | Yamamoto | 43/125 |

Primary Examiner—Kurt Rowan
Attorney, Agent, or Firm—Roger A. Marrs

[57] ABSTRACT

A dry insect extermination device is disclosed herein having box-like housing interiorly supporting an inner frame in spaced relationship to the walls of the housing defining an air conducting passageway between apertures in the housing sidewall and apertures in the frame bottom. The frame supports a heater and a fan for drawing heated air past chemically impregnated packs so that a dry chemical vapor is dispensed from the housing for distribution into the surrounding atmosphere.

2 Claims, 2 Drawing Sheets

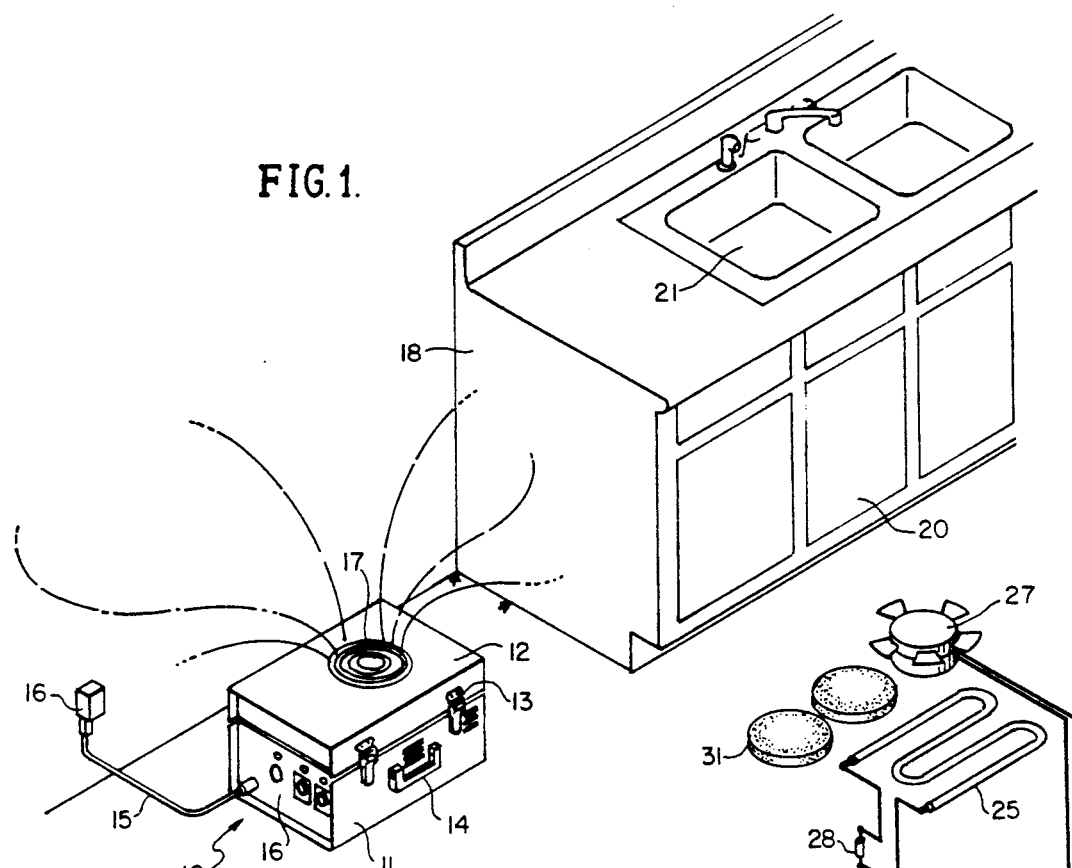
FIG. 1.
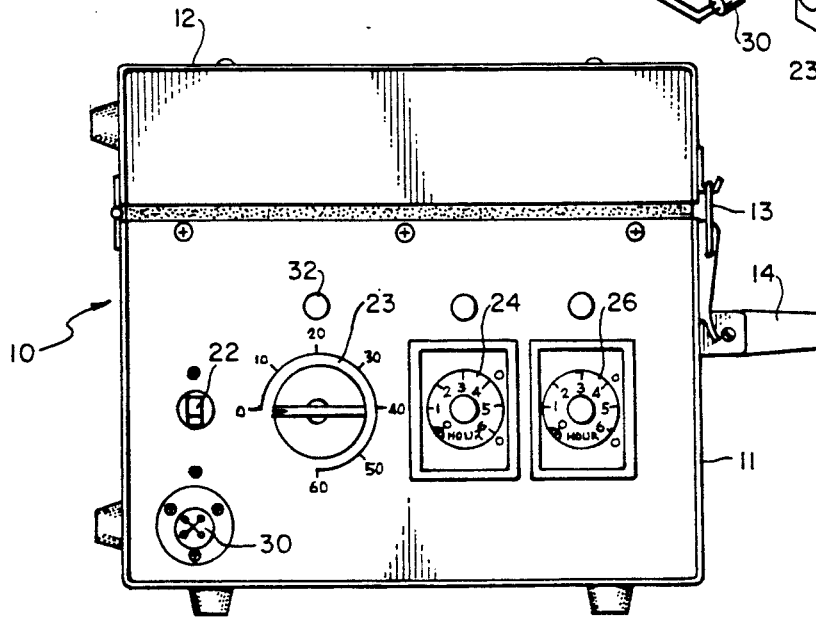
FIG. 2.
FIG. 3.

INSECT EXTERMINATOR

BACKGROUND OF THE INVENTION

1. Field of the Invention

The present invention relates to the field of insect and bug extermination, and more particularly to a novel exterminating device employing a dry chemical vapor which is distributed over an area intended to be freed of insects, bugs or the like.

2. Brief Description of the Prior Art

In the past, it has been the conventional practice to effect the extermination of bugs and insects by employing a variety of aerosol or other pressurized systems for distributing a wet mist in a limited area in order to spread a chemical substance for contacting specific insects or bugs. Such devices are normally called "foggers" and employ a pressurized canister with a manually released valve for discharging the wet chemical vapor into the surrounding air.

Difficulties and problems have been encountered when using such prior chemical dispensing devices which reside in the fact that the discharge is a wet mist which is heavy and has a tendency to drop upon the surrounding floor so that only a relatively small area is serviced by the chemical. Also, wet mists generally leave a residue on furniture, sinks, wall surfaces or any utensils or other items upon which the wet mist comes into contact.

Another problem resides in the fact that the chemicals used are highly toxic in wet mist systems and great care must be taken to remove any food, utensils or other articles on which the wet mist may come into contact so that the chemical is not inadvertently ingested by humans or animals.

Therefore, a long standing need has existed to provide a novel chemical vapor distribution system which is dry and that is non-toxic to humans or animals. Such a dry system vastly increases the total area over which the chemical vapor is distributed so that its effectiveness is increased for exterminating bugs or insects. Also, such a novel system should be able to insure that the chemical vapor will penetrate small cracks and crevices and preferably, such a system may be used again and again so that it is not necessary to dispose of pressurized cans or containers.

SUMMARY OF THE INVENTION

Accordingly, the above problems and difficulties are obviated by the present invention which provides a novel insect exterminating means employing a dry chemical vapor distribution system which includes a housing internally supporting a frame so as to define an air passageway extending between apertures in the sidewall of the housing and apertures in the bottom of the frame so that ambient air flow is drawn through the passageway into the interior of the inner frame. Heating means is operably mounted on the inner frame adjacent to the apertured bottom of the frame and fan means are operably supported on the housing so as to draw air through the passageway and the inner frame for discharge externally of the housing. A platform disposed between the heater means and the fan means supports chemically impregnated packs or pads emitting a vapor which is carried by the air flow between the heater means and the fan means so that the resultant dispensing of the air by the fan means results in a chemically laden vapor which is dry.

Therefore, it is among the primary objects of the present invention to provide a novel insect and bug exterminating means which includes an ambient air intake and discharge means for dispensing a dry chemically laden vapor over a wide area for the elimination of bugs and insects.

Another object of the present invention is to provide an exterminating device which discharges a dry chemical vapor and which incorporates reusable or replaceable chemical packs so that the device may be used repeatedly and does not require disposal after a single use.

Yet another object of the present invention is to provide a novel dry chemical vapor system for eliminating the presence of insects and bugs which may be carried from place to place and used repeatedly.

Yet another object of the present invention is to provide a novel insect and bug exterminator using a dry vapor system which is relatively inexpensive in terms of operation and usage and which may employ a variety of vaporizing means including heat, ultrasonics and the dynamics of air flow so that a dry chemical vapor is dispensed over a wide area intended to be rid of insects and bugs.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view showing the novel dry chemical vapor distribution means incorporating the present invention and illustrating the means used in a typical application;

FIG. 2 is a diagrammatic illustration showing the component parts of the exterminating means or apparatus shown in FIG. 1;

FIG. 3 is a front elevational view of the dry vapor extermination means shown in FIG. 1 illustrating the control therefor;

DESCRIPTION OF THE PREFERRED EMBODIMENT

Figure 4:
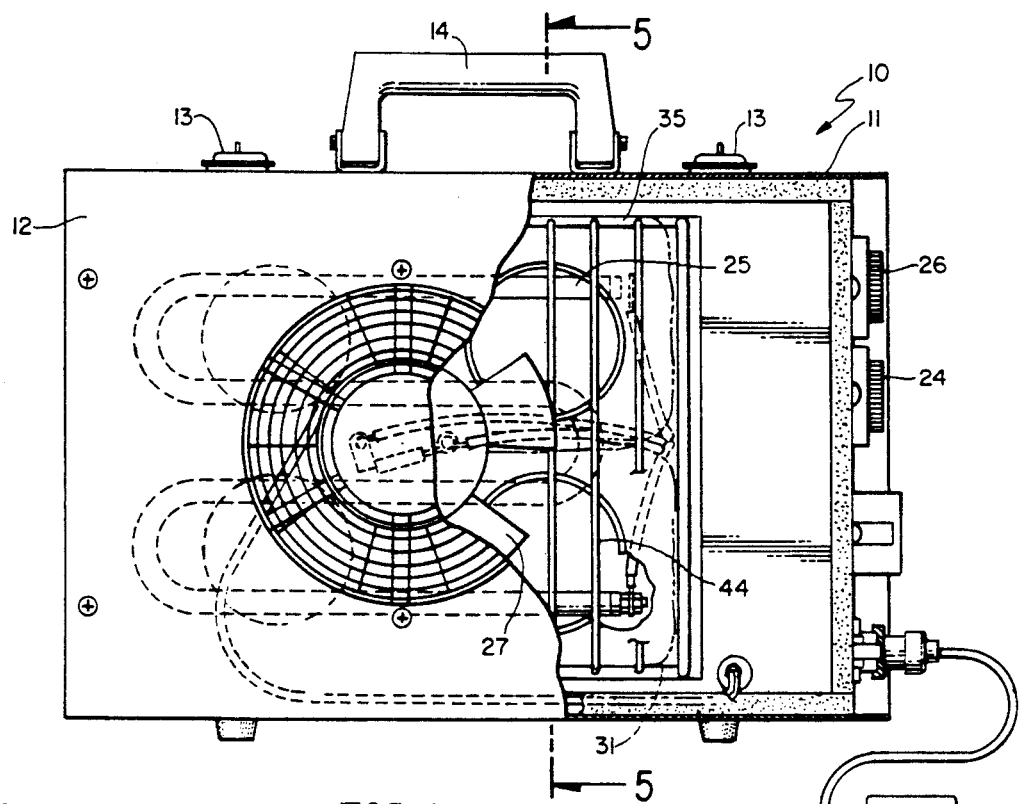
FIG. 4 is a top plan view of the device or apparatus shown in FIGS. 1 and 3 having a portion broken away to expose internal parts.

Referring to FIG. 1, the novel exterminating apparatus of the present invention is identified in the direction of arrow 10 which includes a housing 11 having a pivoting lid 12 which is releasably fastened to the housing by means of snap fasteners, such as fastener or latch 13. A handle 14 is provided for transporting the unit from place to place as the unit is not disposable and may be repeatedly used. The unit may be operated from battery or as illustrated, via line voltage provided by cable 15 from a line source. A converter 16 may be used depending on the voltage available. The apparatus or unit 10 includes a plurality of controls having manual actuators projecting from one end 16 of the apparatus and which includes a discharge vent 17 in the top of the apparatus for passing chemically charged vapor into a surrounding room area. The discharge vent may include a grill to prevent debris from entering the interior of the unit.

FIG. 1 also illustrates the positioning of the exterminating apparatus in a room area adjacent to a conventional cabinet 18 which includes storage cupboards 20 and sinks 21. These areas normally invite infestation by a variety of pests such as ants, bugs, cockroaches or the like. The chemical vapor dispensed by the exterminating unit 10 rises upwardly since it is heated and outwardly propagates because of the forced air distribution. The dry vapor enters cracks and crevices and extends over a wide area so as to reach maximum effectiveness.

Referring now in detail to FIG. 2, it can be seen that the plurality of controls carried on the end panel 16 includes an on/off switch 22 that operates a master timer 23. The timer 23 is associated with an hour clock 24 which operates the length of time that a heater 25 will operate. A second hour timer 26 operates a fan 27 and controls the length of time which the fan will operate. The system includes a fuse 28 and a socket 30 for receiving the plug from cable 15. At least one or more chemically saturated packs or pads 31 are disposed between the heater 25 and the fan 27 so that the chemical impregnated within the pads is vaporized and drawn by the fan through the discharge vent 17. The master timer 23 is arranged to set the operation of the unit for a specified period of time. However, the heater 25 is set to shut off at a time less than the time of fan operation so that the fan will continue to operate after the unit has been effectively shut off in order to permit circulation of ambient air about the room area. The hour timer 24 controls the operation of the heater in conjunction with the hour timer 26 that controls the timing of the fan 27. The heater 25 is of the electrical resistance type so that an open flame is avoided.

Referring now in detail to FIG. 3, it can be seen that each of the timing elements includes a light, such as light 32 associated with the master timer 23 which shows that the timer is in operation.

Figure 5:
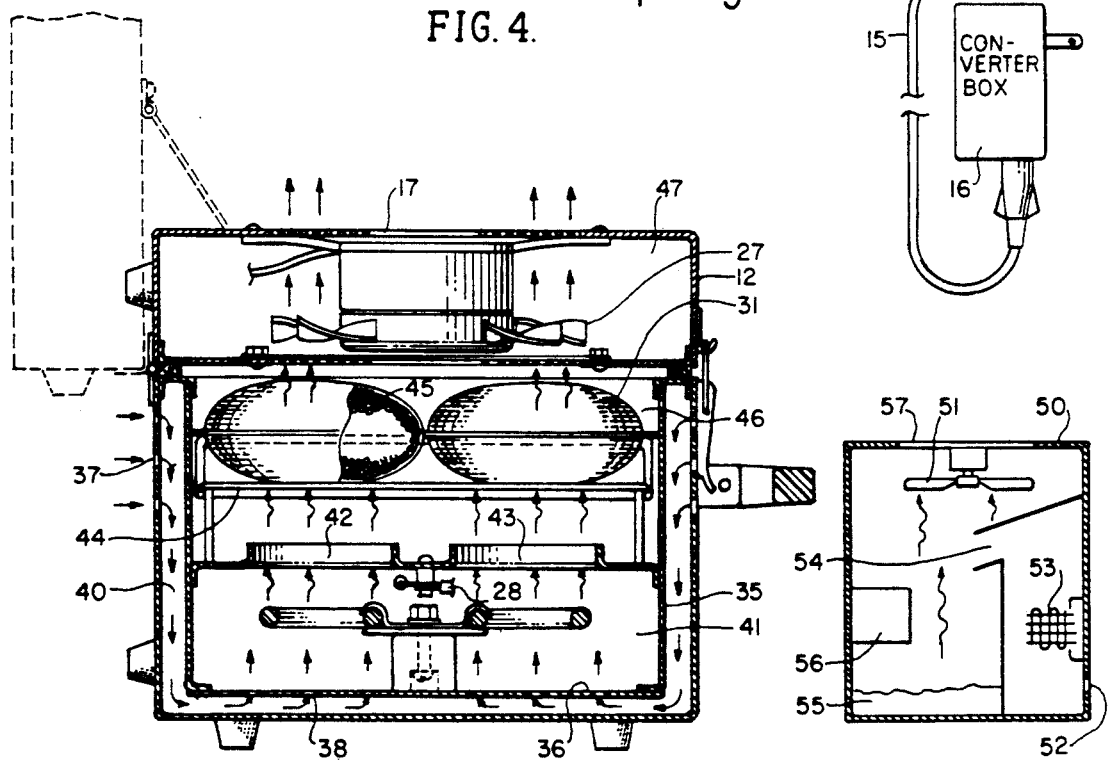
FIG. 5 is a transverse cross-sectional view of the exterminating means or apparatus shown in FIG. 4 as taken in the direction of arrows 5—5 thereof.

Referring now in detail to FIGS. 4 and 5, it can be seen that the housing 11 includes an inner frame which is broadly identified by numeral 35 on which the heater 25 is fixedly carried to the bottom plate 36. It can be seen that the frame 35, particularly in FIG. 5, is arranged in fixed spaced-apart relationship with respect to the inner sidewall of the housing 11 so that a continuous passageway is established between a plurality of inlet apertures 37 and a plurality of apertures 38 carried on the plate 36. In this manner, ambient air is drawn in the direction of the arrows from outside the housing through the apertures 37, through a passageway 40 and through the apertures 38 into the interior of the frame 35. The air within the heating chamber established by numeral 41 is then introduced through large openings 42 and 43 to the underside of pads 31. The pads 31 are carried on a grill-type platform 44 and the heated pair vaporizes the chemical contained within the pervious granules 45 contained within a fabric surrounding the granules. Next, the heated and chemically vaporized air continues to be drawn by the fan 27 for discharge through the discharge vent 17 and dispersal throughout the area of the room. In one form of the invention, the chemical is composed of an oil texture or oil evaporative substance so as not to leave a sticky film on any residue upon which the vapor may rest. The chemical may be considered a DDVP chemical, such as Pyrthrium which is a substance non-toxic to humans and animals. Preferably, five percent of the chemical is employed to saturate the granules in solution with 95% distilled water. In such a low percentage, the chemical is non-toxic.

Therefore, with reference to FIG. 5, it can be seen that the extermination apparatus or device of the present invention includes a housing with an interior frame defining a passageway 40 for conducting ambient air into an enclosure of the frame 35. The air enters the heating chamber 41 and then into the vaporizing chamber 46 followed by exhausting through the fan chamber 47 and the exhaust vent 17. When it is desired to replace the pads 31, the cover 12 may be pivoted about its hinges to the position shown in broken lines which provides access for replacement of the pads. Those in which the chemical has been totally evaporated may be replaced with fresh pads. The fan in the fan chamber 47 is carried on the lid and pivots out of the way when the lid is pivoted to the open position as shown in broken lines.

Figure 6:
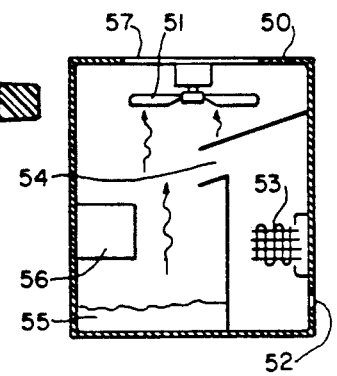
FIG. 6 is a diagrammatic cross-sectional view of another embodiment of the present invention employing an ultrasonic means for generating a chemical vapor.

Referring now in detail to FIG. 6, another embodiment of the present invention is illustrated wherein the housing 50 includes a fan 51 for drawing air into and through a port 52 into the interior of the housing. The air passes past a heater 53 into a condensing chamber 54 and then the heated air is mixed with a vapor from a chemical liquid 55. The chemical liquid is vaporized by means of an ultrasonic source 56 so that the vapor is expelled through the vent exhaust 57 into the surrounding room area. Controls such as previously described are carried on the housing 50 and are operably connected to the fan, heater and ultrasonic source 56. In this instance, the chemical is provided in liquid form rather than saturated granules as carried in pads or packs. However, it is to be also understood that the packs previously described may also be used in the embodiment shown in FIG. 6.

In view of the foregoing, it can be seen that the inventive concept is a means for vaporizing a chemical substance non-toxic to humans and animals which is propagated throughout a room area by a fan. The device is self-contained within a housing and may be used repeatedly without discard or disposal of the entire unit as is the case with conventional "foggers". In either the ultrasonic embodiment shown in FIG. 6 or the embodiment shown in FIGS. 4 and 5, air is mixed with the vapor and expelled by means of the fan.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A bug and insect exterminator emitting a dry fumigating vapor comprising:
a housing having internal partitions defining a heating chamber, a vaporizing compartment and blower chamber;

means disposed in said housing for conducting ambient air from said heating chamber to said blower chamber via said vaporizing compartment and for dispensing the ambient air external of said housing;

a heater means mounted in said heater chamber;

a fan mounted in said blower chamber;

chemical supply disposed in said vaporizing compartment in the path of the ambient air passing between said heater and blower chambers;

control means carried on said housing operably coupled to said heater means and said fan for selectively determining the time duration of operation of each;

said supply of chemical is characterized as being toxic to bugs and insects and non-toxic to humans and animals; and said supply of chemical is a liquid disposed in said housing and includes an ultrasonic transducer mounted internally of said housing within said vaporizing compartment for vaporizing said supply of chemical.

2. A bug and insect exterminator emitting a dry fumigating vapor comprising:

a housing having internal partitions defining a heating chamber, a vaporizing compartment and blower chamber;

means disposed in said housing for conducting ambient air from said heating chamber to said blower chamber via said vaporizing compartment and for dispensing the ambient air external of said housing;

a heater means mounted in said heater chamber;

a fan mounted in said blower chamber;

chemical supply disposed in said vaporizing compartment in the path of the ambient air passing between said heater and blower chambers;

control means carried on said housing operably coupled to said heater means and said fan for selectively determining the time duration of operation of each;

said supply of chemical is characterized as being toxic to bugs and insects and non-toxic to humans and animals;

said housing includes a grill-like platform supporting said supply of chemical;

said supply of chemical being at least one pack of chemical impregnated granules;

said housing further includes a frame supporting said heater chamber, blower chamber and vaporizing compartment and mounted within said housing to define an air passageway between said frame and said housing; and said housing having a plurality of apertures opening externally to communicate with one end of said passageway and said frame having a plurality of apertures communicating the other end of said passageway with said heater chamber.

* * * * *